(12) United States Patent
Roman et al.

(10) Patent No.: US 8,777,249 B1
(45) Date of Patent: Jul. 15, 2014

(54) HAND MOTION WHEELCHAIR ASSEMBLY

(71) Applicants: David Roman, Rosedale, NY (US); Eric James, New York, NY (US)

(72) Inventors: David Roman, Rosedale, NY (US); Eric James, New York, NY (US)

(*) Notice: Subject to any disclaimer, the term of this patent is extended or adjusted under 35 U.S.C. 154(b) by 0 days.

(21) Appl. No.: 13/659,954

(22) Filed: Oct. 25, 2012

Related U.S. Application Data

(63) Continuation-in-part of application No. 12/925,416, filed on Oct. 21, 2010, now abandoned, which is a continuation-in-part of application No. 12/072,394, filed on Feb. 26, 2008, now abandoned.

(60) Provisional application No. 60/922,976, filed on Apr. 11, 2007.

(51) Int. Cl.
*B62M 1/14* (2006.01)
*A61G 5/02* (2006.01)

(52) U.S. Cl.
CPC ............... *A61G 5/021* (2013.01); *A61G 5/026* (2013.01); *B62M 1/14* (2013.01)
USPC ..................... 280/250; 280/249; 280/250.1

(58) Field of Classification Search
USPC ........... 280/250.1, 304.1, 249, 250, 259, 261, 280/211, 242.1
See application file for complete search history.

(56) References Cited

U.S. PATENT DOCUMENTS

| | | | |
|---|---|---|---|
| 531,330 | A | 12/1894 | Potter |
| 882,248 | A | 3/1908 | Haas |
| 1,809,740 | A | 6/1931 | Tebieff |
| 2,847,058 | A | 8/1958 | Lee |
| 4,758,013 | A | 7/1988 | Agrillo |
| 5,211,414 | A | 5/1993 | Galumbeck |
| 5,632,499 | A | 5/1997 | Hutcherson et al. |
| 5,683,321 | A | 11/1997 | Barnett |
| 6,247,715 | B1 | 6/2001 | Korosue |
| 6,257,608 | B1 | 7/2001 | Hanson |
| 6,910,701 | B1 | 6/2005 | Long et al. |
| 2009/0102157 | A1 | 4/2009 | Sanchez |

*Primary Examiner* — Anne Marie Boehler
(74) *Attorney, Agent, or Firm* — Emery L. Tracy; Ruth Eure

(57) ABSTRACT

A wheelchair assembly for propelling a wheelchair is provided. The wheelchair has front wheels and rear wheels and a pair of armrests. The wheelchair assembly comprises a first gear wheel secured to each rear wheel and a second gear wheel secured to each armrest. The second gear wheel is positioned directly over the first gear wheel with the second gear wheel being completely encased by a cover. A chain is secured over and between the first and second gear wheels and extends from an opening in the cover. Rotatable handles are attached to each armrest with each having a grasping portion extending Upward. A control linkage extends between the handles and the second gear wheels and mounted to and under the armrest such that rotation of the handles also rotates the second gear wheels with the control linkage being perpendicular to the line formed between the first and second gear wheels.

18 Claims, 2 Drawing Sheets

HAND MOTION WHEELCHAIR ASSEMBLY

The present application is a continuation-in-part of U.S. patent application Ser. No. 12/925,416, filed on Oct. 21, 2010, entitled "Hand Motion Wheelchair Assembly", now abandoned, which is a continuation-in-part of U.S. patent application Ser. No. 12/072,394, filed Feb. 26, 2008, entitled "Hand Motion Wheelchair Assembly", now abandoned, which claims benefit of priority of provisional patent application Ser. No. 60/922,976, filed on Apr. 11, 2007, entitled "Hand Motion Wheelchair".

BACKGROUND OF THE INVENTION

1. Field of the Invention

This invention relates generally to a hand motion wheelchair assembly and, more particularly, the invention relates to a hand motion wheelchair assembly providing easier operation of a manually operated wheelchair and reducing or eliminating the need for assistance by others.

2. Description of the Prior Art

America is a country which is in the aging process with the fastest growing age segment being the elderly. There are undoubtedly many reasons for this increase in the older population but probably the two biggest reasons are that advances in medical science and increased awareness of the importance of a healthy diet is prolonging the life expectancy of Americans.

Although Americans are living longer, the ravages of time still takes its toll on the physical capabilities of older individuals. Consequently, many people suffer from varying degrees of impaired mobility, requiring the use of some type of assistive device to get around. One of the more common, and beneficial, assistive devices used is the wheelchair. Not all wheelchair users are confined to these devices because of age attributed impairment; there are quite a few people who suffer from cerebral palsy or other debilitating diseases who must use wheelchairs for ambulatory purposes. Many individuals are confined to a wheelchair as the result of a stroke, a common term for cerebral thrombosis (a blood clot that interrupts the blood supply of the brain) and for cerebral hemorrhage (a rupture in a blood vessel that allows blood to escape into the brain tissue). Both can cause brain damage with resulting partial or complete paralysis or, possibly, death.

As anyone who uses a manually operated wheelchair can attest, propelling and maneuvering a wheelchair is a physically tiring task and many individuals rely on the assistance of others, either occasionally or on a regular basis.

SUMMARY

The present invention is a hand motion wheelchair assembly for propelling a wheelchair. The wheelchair has two small front wheels and two large rear wheels, a seat portion, and a pair of armrests. The hand motion wheelchair assembly comprises a first gear wheel secured to each large rear wheel and a second gear wheel secured to each armrest and positioned directly over the first gear wheel. A chain is secured over and between the first gear wheel and the second gear wheel. Rotatable handles are mechanically attached to each armrest on each side of the wheelchair with each handle having a handle grasping portion extending in a generally upward vertical direction from each armrest. A control linkage extends between the handles and the second gear wheels and under the armrest such that rotation of the handles also rotates the second gear wheels with the control linkage being perpendicular to the line formed between the first gear wheel and the second gear wheel.

In addition, the present invention includes a method for propelling a wheelchair. The wheelchair has two small front wheels and two large rear wheels, a seat portion, and a pair of armrests. The method comprises securing a first gear wheel to each large rear wheel, securing a second gear wheel to each armrest, positioning the second gear wheel directly over the first gear wheel, securing a chain over and between the first gear wheel and the second gear wheel, attaching rotatable handles to each armrest on each side of the wheelchair with each handle having a handle grasping portion extending in a generally upward vertical direction from each armrest, and extending a control linkage between the handles and the second gear wheels and under the armrest such that rotation of the handles also rotates the second gear wheels and the control linkage is perpendicular to the line formed between the first gear wheel and the second gear wheel.

The present invention further includes a hand motion wheelchair assembly for propelling a wheelchair. The wheelchair has two small front wheels and two large rear wheels, a seat portion, and a pair of armrests. The hand motion wheelchair assembly comprises a first gear wheel secured to each large rear wheel and a second gear wheel secured to each armrest with the second gear wheel mounted directly over the first gear wheel and positioned directly over the first gear wheel. A chain is secured over and between the first gear wheel and the second gear wheel. Rotatable handles are mechanically attached to each armrest on each side of the wheelchair with each handle having a handle grasping portion extending in a generally upward vertical direction from each armrest. A control linkage extends between the handles and the second gear wheels and under the armrest such that rotation of the handles also rotates the second gear wheels with the control linkage being perpendicular to the line formed between the first gear wheel and the second gear wheel. The diameter of the first gear wheel is greater than a diameter of the second gear wheel.

DETAILED DESCRIPTION OF THE PREFERRED EMBODIMENTS

Figure 2:
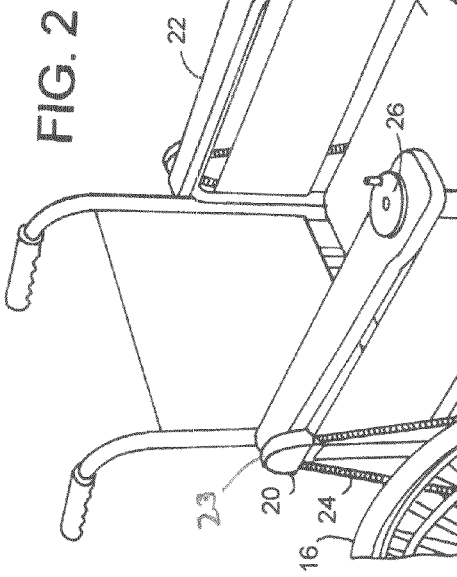
FIG. 2 is a top perspective view illustrating the hand motion wheelchair assembly, constructed in accordance with the present invention.
Figure 1:
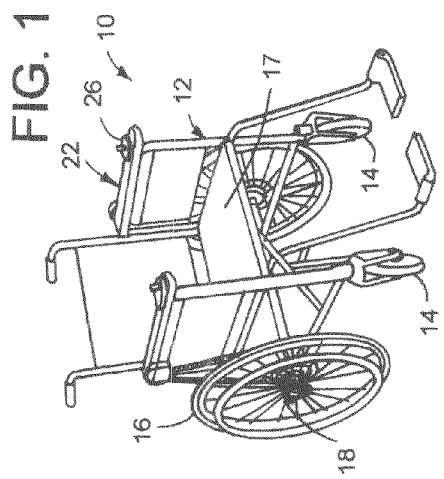
FIG. 1 is a front perspective view illustrating a hand motion wheelchair assembly, constructed in accordance with the present invention.
Figure 4:
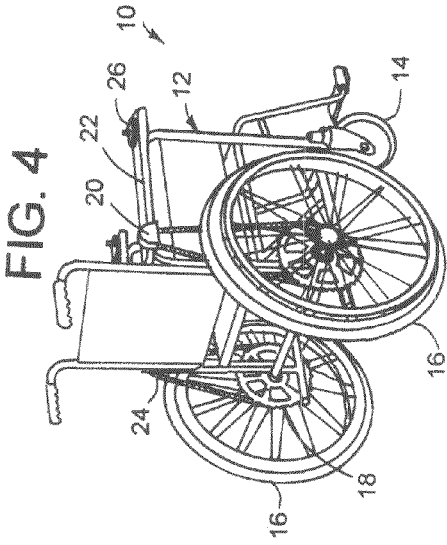
FIG. 4 is a rear perspective view illustrating the hand motion wheelchair assembly, constructed in accordance with the present invention.
Figure 3:
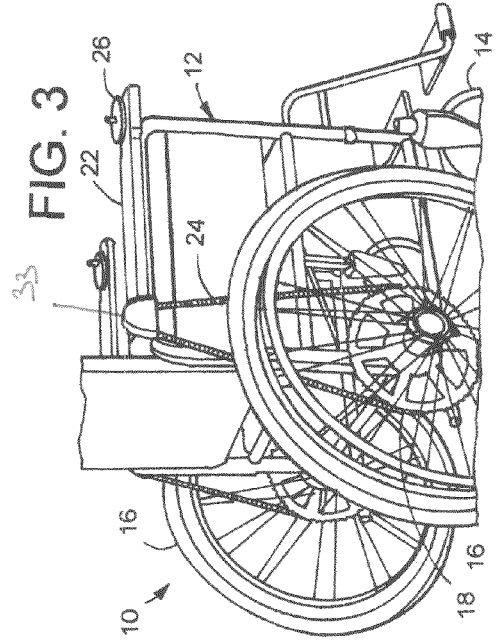
FIG. 3 is a side perspective view illustrating the hand motion wheelchair assembly, constructed in accordance with the present invention.
Figure 6:
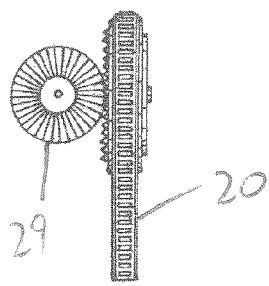
FIG. 6 is an end view illustrating a portion of a toothed-gear connector of the control linkage between the handle and the second gear wheel of the hand motion wheelchair assembly, constructed in accordance with the present invention.
Figure 5:
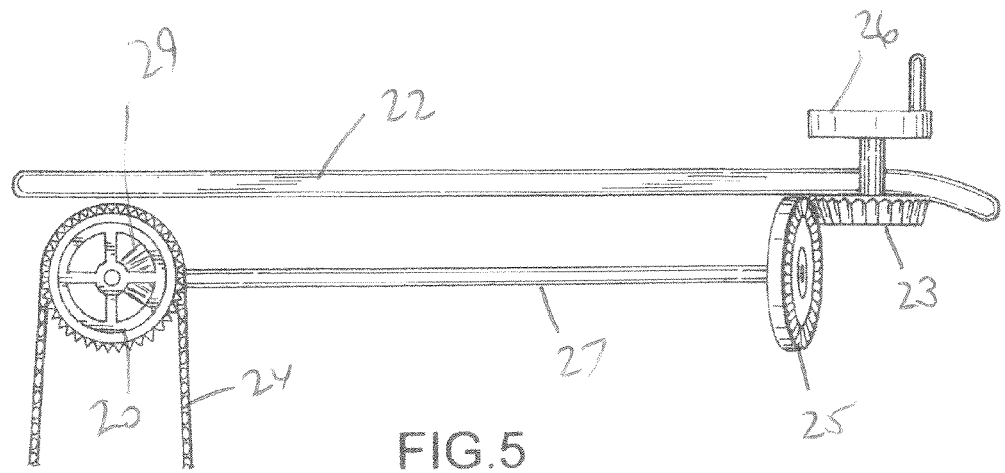
FIG. 5 is an elevational side view illustrating control linkage between the handle and the second gear wheel of the hand motion wheelchair assembly, constructed in accordance with the present invention, with the gear cover removed.
Figure 7:
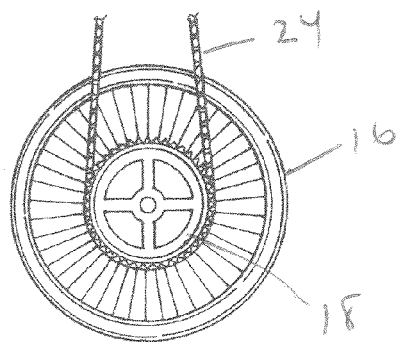
FIG. 7 is an elevational side view illustrating the chain between the first gear wheel and the second gear wheel of the hand motion wheelchair assembly, constructed in accordance with the present invention.

As illustrated in FIGS. 1-7, the present invention is a hand motion wheelchair assembly, indicated generally at 10, for allowing a person to propel a manually operated wheelchair 12 much easier and for reducing or eliminating the need for assistance by others.

The hand motion wheelchair assembly 10 of the present invention is a mechanical device retrofittable onto existing wheelchairs or integrally attached to new wheelchairs at the time of manufacture. Typically, the wheelchair 12 has two small front wheels 14 and two large rear wheels 16, a seat portion 17, and a pair of armrests 22. It should be noted that any type of manually operated wheelchair is within the scope of the present invention and is not limited to the wheelchair 12 described and illustrated herein.

The hand motion wheelchair assembly 10 of the present invention includes a first gear wheel 18 secured to each large rear wheel 16 such that rotation of the first gear wheel 18 causes rotation of the large rear wheels 16 and a second gear wheel 20 secured under each armrest 22 and preferably mounted directly over the large gear wheel 18. Preferably, the second gear wheel is completely encased by a cover 33. A chain 24 is secured over and between the first gear wheel 18 and the second gear wheel 20 with the chain extending from an opening formed in the cover 33. Rotatable handles 26 are mechanically attached to the top of each armrest 22 on each side of the wheelchair 12, and a control linkage 28 between the handles 26 and the second gear wheels 20 such that by turning the handles 26 also turns the second gear wheels 20. Preferably, the control linkage 28 is mounted directly to and directly under the armrest 22 such that rotation of the handles 26 also rotates the second gear wheels 20.

Preferably, the control linkage 28 of the hand motion wheelchair assembly 10 of the present invention comprises a first control gear wheel 23 rotationally connected to each of the handles 26. The first control gear 23 is mounted directly beneath each armrest 22 directly under the armrest handle 26 and rotates upon rotation of the respective handle 26. A second control gear 25 is mounted perpendicular to the first control gear wheel 23 with the teeth of each gear wheel engaging such that the rotation of the first control gear wheel 23 causes rotation of the second control gear wheel 25. A drive shaft 27 extends between the second control gear wheel 25 and the second gear wheel 20 which a toothed-gear connector 29 between the drive shaft 27 and the second gear wheel 20 wheel such that rotation of the second control gear 25 rotates the drive shaft 27, which in turn rotates the second gear wheel 20. The first control gear wheel 23, the second control gear wheel 25, the drive shaft 27, and the second gear wheel 20 are all positional directly below the armrest 22 for inhibiting any contact with these parts by the user of the wheelchair 12. In addition, the control linkage 28 is preferably perpendicular to the line formed between the first gear wheel 18 and the second gear wheel 20.

The rigid, preferably plastic handles 26 (a right handle mounted on the right armrest and a left handle mounted on the left armrest) of the hand motion wheelchair assembly 10 of the present invention function as steering control levers used to change the direction of gear rotation and gear ratio of the large gear wheels 18 and the smaller gear wheels 20. To move in a forward direction, for instance, both control levers and handles 26 are turned in a clockwise direction. To move in a reverse direction, the control levers or handles 26 are turned in a counterclockwise direction. For making turns, the corresponding control lever 26 (right or left) is maneuvered, only. To make a right turn, the right control lever 26 is turned clockwise and, to make a left turn, the left control lever 26 is turned counterclockwise.

All wheelchair users can beneficially use the hand motion wheelchair assembly 10 of the present invention, providing an easier way to maneuver and propel a wheelchair 12 to improve their quality of life and reduce their reliance on other individuals.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A hand motion wheelchair assembly for propelling a wheelchair, the wheelchair having two small front wheels and two large rear wheels, a seat portion, and a pair of armrests, the hand motion wheelchair assembly comprising:
    a first gear wheel secured to each large rear wheel;
    a second gear wheel secured to each armrest and positioned directly over the first gear wheel, the second gear wheel being encased by a cover;
    a chain secured over and between the first gear wheel and the second gear wheel, the chain extending from an opening formed in the cover;
    rotatable handles mechanically attached to each armrest on each side of the wheelchair, each handle having a handle grasping portion extending in a generally upward vertical direction from each armrest; and
    a control linkage extending between the handles and the second gear wheels and mounted directly to and directly under the armrest such that rotation of the handles also rotates the second gear wheels, the control linkage being perpendicular to a line formed between the first gear wheel and the second gear wheel.

2. The hand motion wheelchair assembly of claim 1 wherein a diameter of the first gear wheel is greater than a diameter of the second gear wheel.

3. The hand motion wheelchair assembly of claim 1 wherein the control linkage comprises a first control gear wheel rotationally connected to each of the handles, a second control gear mounted perpendicular to the first control gear wheel with teeth of each gear wheel engaging such that the rotation of the first control gear wheel causes rotation of the second control gear wheel, and a drive shaft extending between the second control gear wheel and the second gear wheel together with a toothed-gear connector between the drive shaft and the second gear wheel such that rotation of the second control gear rotates the drive shaft, which in turn rotates the second gear wheel.

4. The hand motion wheelchair assembly of claim 3 wherein the first control gear wheel, the second control gear wheel, the drive shaft and the second gear wheel are all positioned directly below the armrest.

5. The hand motion wheelchair assembly of claim 1 and further comprising:
    a first handle positioned on a right armrest; and
    a second handle positioned on a left armrest.

6. The hand motion wheelchair assembly of claim 5 wherein movement of the wheelchair in a generally forward direction occurs upon rotation of both the first handle and the second handle in a clockwise direction and wherein movement of the wheelchair in a generally reverse direction occurs upon rotation of both the first handle and the second handle in a counterclockwise direction.

7. The hand motion wheelchair assembly of claim 5 wherein movement of the wheelchair to the right occurs upon rotation of the first handle only in a clockwise direction.

8. The hand motion wheelchair assembly of claim 5 wherein movement of the wheelchair to the left occurs upon rotation of the second handle only in a counterclockwise direction.

9. A method for propelling a wheelchair, the wheelchair having two small front wheels and two large rear wheels, a seat portion, and a pair of armrests, the method comprising:
   securing a first gear wheel to each large rear wheel;
   securing a second gear wheel to each armrest;
   encasing the second gear wheel by a cover;
   positioning the second gear wheel directly over the first gear wheel;
   securing a chain over and between the first gear wheel and the second gear wheel;
   extending the chain from an opening in the cover;
   attaching rotatable handles to each armrest on each side of the wheelchair, each handle having a handle grasping portion extending in a generally upward vertical direction from each armrest; and
   extending a control linkage between the handles and the second gear wheels; and
   mounting the control linkage directly to and directly under the armrest such that rotation of the handles also rotates the second gear wheels and the control linkage is perpendicular to the line formed between the first gear wheel and the second gear wheel.

10. The method of claim 9 wherein a diameter of the first gear wheel is greater than a diameter of the second gear wheel.

11. The method of claim 9 and further comprising:
    positioning a first handle on a right armrest; and
    positioning a second handle on a left armrest.

12. The method of claim 11 and further comprising:
    rotating both the first handle and the second handle in a clockwise direction;
    propelling the wheelchair in a generally forward direction;
    rotating both the first handle and the second handle in a counterclockwise direction; and
    propelling the wheelchair in a generally reverse direction.

13. The method of claim 11 and further comprising:
    rotating the first handle only in a clockwise direction;
    propelling the wheelchair to the right;
    rotating the second handle only in a counterclockwise direction; and
    propelling the wheelchair to the left.

14. A hand motion wheelchair assembly for propelling a wheelchair, the wheelchair having two small front wheels and two large rear wheels, a seat portion, and a pair of armrests, the hand motion wheelchair assembly comprising:
    a first gear wheel secured to each large rear wheel;
    a second gear wheel secured to each armrest, the second gear wheel mounted directly over the first gear wheel;
    a chain secured over and between the first gear wheel and the second gear wheel;
    rotatable handles mechanically attached to each armrest on each side of the wheelchair, each handle having a handle grasping portion extending in a generally upward vertical direction from each armrest; and
    a control linkage extending between the handles and the second gear wheels and mounted directly to and directly under the armrest such that rotation of the handles also rotates the second gear wheels, the control linkage being perpendicular to a line formed between the first gear wheel and the second gear wheel;
    wherein a diameter of the first gear wheel is greater than a diameter of the second gear wheel.

15. The hand motion wheelchair assembly of claim 14 and further comprising:
    a first handle positioned on a right armrest; and
    a second handle positioned on a left armrest.

16. The hand motion wheelchair assembly of claim 15 wherein movement of the wheelchair in a generally forward direction occurs upon rotation of both the first handle and the second handle in a clockwise direction.

17. The hand motion wheelchair assembly of claim 15 wherein movement of the wheelchair in a generally reverse direction occurs upon rotation of both the first handle and the second handle in a counterclockwise direction.

18. The hand motion wheelchair assembly of claim 14 wherein the control linkage comprises a first control gear wheel rotationally connected to each of the handles, a second control gear mounted perpendicular to the first control gear wheel with teeth of each gear wheel engaging such that the rotation of the first control gear wheel causes rotation of the second control gear wheel, and a drive shaft extending between the second control gear wheel and the second gear wheel together with a toothed-gear connector between the drive shaft and the second gear wheel such that rotation of the second control gear rotates the drive shaft, which in turn rotates the second gear wheel.

* * * * *